US009276724B2

(12) United States Patent
Tesanovic et al.

(10) Patent No.: US 9,276,724 B2
(45) Date of Patent: Mar. 1, 2016

(54) MITIGATION OF CONTROL CHANNEL INTERFERENCE

(75) Inventors: Milos Tesanovic, Harrow (GB); Timothy James Moulsley, Caterham (GB)

(73) Assignee: Koninklijke Philips N.V., Eindhoven (NL)

(*) Notice: Subject to any disclaimer, the term of this patent is extended or adjusted under 35 U.S.C. 154(b) by 319 days.

(21) Appl. No.: 13/576,951

(22) PCT Filed: Feb. 9, 2011

(86) PCT No.: PCT/IB2011/050541
§ 371 (c)(1),
(2), (4) Date: Aug. 3, 2012

(87) PCT Pub. No.: WO2011/098955
PCT Pub. Date: Aug. 18, 2011

(65) Prior Publication Data
US 2012/0320855 A1    Dec. 20, 2012

(30) Foreign Application Priority Data

Feb. 15, 2010 (EP) .................................... 10305152

(51) Int. Cl.
*H04W 72/00* (2009.01)
*H04B 15/00* (2006.01)
*H04L 5/00* (2006.01)

(52) U.S. Cl.
CPC ............ *H04L 5/0053* (2013.01); *H04L 5/0062* (2013.01)

(58) Field of Classification Search
CPC .............. H04L 27/206; H04L 27/2633; H04L 27/2646; H04L 27/2666; H04L 27/2698; H04L 27/2675; H04L 27/2691; H04B 7/066; H04B 2201/69; H04B 2201/136

USPC .................................................. 370/325–335
See application file for complete search history.

(56) References Cited

U.S. PATENT DOCUMENTS

| 2003/0086385 | A1* | 5/2003 | Kwon et al. ................... 370/320 |
| 2009/0175159 | A1* | 7/2009 | Bertrand et al. ............... 370/203 |

(Continued)

OTHER PUBLICATIONS

LG Electronics: "Considerations on Interference Coordination in Heterogeneous Networks", 3GPP Draft, R1-100236 Interference Coordination in Hetnet V2, 3rd Generation Partnership Project, vol. RAN WG1, Jan. 12, 2010, p. 1-5.
NTT Docomo: "Comparison of Carrier Segment and Extension Carrier for Contiguous Carrier Aggregation", 3GPP Draft, R1-100491 Component Carrier Types, 3rd Generation Partnership Project, vol. RAN WG1, Jan. 12, 2010, p. 1-5.

(Continued)

*Primary Examiner* — Andrew Chriss
*Assistant Examiner* — Romani Ohri

(57) ABSTRACT

The present invention relates to a method for operating a network comprising a first primary station and a second primary station, wherein the first primary station serves a first cell including at least one first secondary station communicating with the first primary station and wherein the second primary station serves a second cell including at least one second secondary station communicating with the second primary station, the method comprising the steps of (a) the first primary station and the second primary station transmitting payloads in a synchronous manner on at least one set of resources, (b) the first and the second primary stations transmitting control data on the at least one set of resources respectively to the first secondary station and to the second secondary station, wherein the method further comprises (c) at least the first primary station rendering the transmission of control data to the first secondary station orthogonal to the transmission of control data from the second primary station.

57 Claims, 4 Drawing Sheets

(56) References Cited

U.S. PATENT DOCUMENTS

| | | | |
|---|---|---|---|
| 2009/0209247 A1* | 8/2009 | Lee et al. | 455/422.1 |
| 2009/0238099 A1* | 9/2009 | Ahmavaara | 370/254 |
| 2009/0268909 A1 | 10/2009 | Girao et al. | |
| 2010/0035555 A1 | 2/2010 | Bala et al. | |
| 2010/0173637 A1* | 7/2010 | Damnjanovic et al. | 455/447 |
| 2010/0177746 A1* | 7/2010 | Gorokhov et al. | 370/336 |
| 2011/0077038 A1* | 3/2011 | Montojo et al. | 455/507 |
| 2011/0194523 A1* | 8/2011 | Chung et al. | 370/329 |
| 2011/0255486 A1* | 10/2011 | Luo et al. | 370/329 |
| 2012/0093098 A1* | 4/2012 | Charbit et al. | 370/329 |
| 2012/0115468 A1* | 5/2012 | Lindoff et al. | 455/434 |

OTHER PUBLICATIONS

Philips: "Mitigation of Control Channel Interference", 3GPP Draft, R1-101288, 3rd Generation Partnership Project, vol. RAN WG1, Feb. 16, 2010, p. 1-4.

KDDE, NTT DoCoMo, Multiplexing of PDCCHs of Multiple UEs in E-Utra Downlink, 3GPP TSG RAN WG1 Meeting #51BIS, Sevilla, Spain, Jan. 14-18, 2008, R1-080220, p. 1-3.

LG Electronics, "Phich to Re Maping", 3GPP TSG RAN WG1 #51BIS, Sevilla, Spain, Jan. 14-18, 2008, R1-080537, p. 1-4.

* cited by examiner

MITIGATION OF CONTROL CHANNEL INTERFERENCE

FIELD OF THE INVENTION

The invention relates to a cellular network comprising a plurality of cells which may be interfering one with another, like in UMTS Long Term Evolution.

More specifically, the invention relates to a method for reducing interference occurring for control data between two interfering cells. This case occurs for example, but not only, for the case of synchronous cells transmissions.

This invention is, for example, relevant for mobile telecommunication networks like UMTS, UMTS LTE networks, or like broadband wireless networks or WLANs.

BACKGROUND OF THE INVENTION

In many wireless systems control-channel signalling is needed that indicates the particular time-frequency transmission resources to which the data is mapped, and the format/mode in which the data itself is transmitted. For UMTS LTE Rel-8 downlink communication, the relevant control channel that includes resource allocation and transmission format information is known as Physical Downlink Control Channel (PDCCH).

Each PDCCH is transmitted using one or more Control Channel Elements (CCEs), where each CCE corresponds to a plurality of sets of four physical resource elements. The number of CCEs used for transmission of a particular PDCCH is determined according to the channel conditions by the primary station, the ENodeB (or eNB) in LTE.

PDCCH transmissions from neighbouring or overlapping cells at the same carrier frequency may interfere with one another. This problem will become especially pronounced if the cells in question are synchronized or nearly synchronized with time-aligned transmissions. Indeed, in this case, the two transmissions of PDCCH may occur exactly at the same time and collides one with another. On the other hand, for some transmission modes, such as CoMP (Co-operative Multi-Point), synchronisation is deemed essential for satisfactory performance. Indeed, Co-operative Multi-Point transmissions are generally MIMO transmissions where antennas from a plurality of cells are used for a single transmission to users.

Ways of mitigating the PDCCH interference are therefore required.

In LTE Release 8 the main mechanism for mitigating the effect of interference on the PDCCH is randomization of the Resource Elements (REs) in the frequency domain (over the system bandwidth) and in the time domain (over the OFDM symbols reserved for control channels).

Existing methods for increasing robustness by randomisation in LTE include:

Increased sparseness of control channels. This can be done e.g. by expanding to 3 OFDM symbols, even if this is not required by PDCCH loading.

Power boosting the PDCCH transmissions. This is effective against PDSCH interference since PDSCH is not power boosted. However, it needs to be combined with "increased sparseness" to be highly efficient.

Increased aggregation level used for PDCCH. This would increase robustness for an individual PDCCH transmission, but would lead to higher interference, so is not likely to be very effective.

However, none of these methods are effective enough, especially in case of fully aligned transmissions, like for a single base station which is serving two or three interfering cells.

SUMMARY OF THE INVENTION

It is an object of the invention to propose a method which alleviates the above mentioned problems.

It is another object of the invention to provide a method for reducing the interference of PDCCHs experienced because of synchronised or nearly synchronised cells.

It is another object of the invention to improve the quality of reception of the control data especially at the edge of the cells.

In accordance with a first aspect of the invention, a method is proposed for operating a network comprising a first primary station and a second primary station, wherein the first primary station serves a first cell including at least one first secondary station communicating with the first primary station and wherein the second primary station serves a second cell including at least one second secondary station communicating with the second primary station, the method comprising the steps of (a) the first primary station and the second primary station transmitting payload in a synchronous manner on at least one set of resources, (b) the first and the second primary stations transmitting control data on the at least one set of resources respectively to the first secondary station and to the second secondary station, wherein the method further comprises (c) at least the first primary station rendering the transmission of control data to the first secondary station orthogonal to the transmission of control data from the second primary station.

The present invention also relates to a primary station comprising means for operating a network comprising a the primary station and a further primary station, wherein the primary station serves a first cell including at least one first secondary station communicating with the primary station and wherein the further primary station serves a second cell including at least one second secondary station communicating with the second primary station, the primary station comprising means for transmitting payload synchronously with the further primary station on at least one set of resources, wherein the means for transmitting are arranged for transmitting control data on the at least one set of resources to the first secondary station, and wherein the primary station is arranged for rendering the transmission of control data to the first secondary station orthogonal to transmission of control data from the further primary station.

According to another aspect of the invention, it is proposed a secondary station comprising means implementing the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The invention relates to a cellular network divided into cells, each cell being served by a primary station and the secondary station within one cell are communicating at least with the primary station serving the considered cell. A single primary station may serve more than one cell (usually three).

Figure 1:
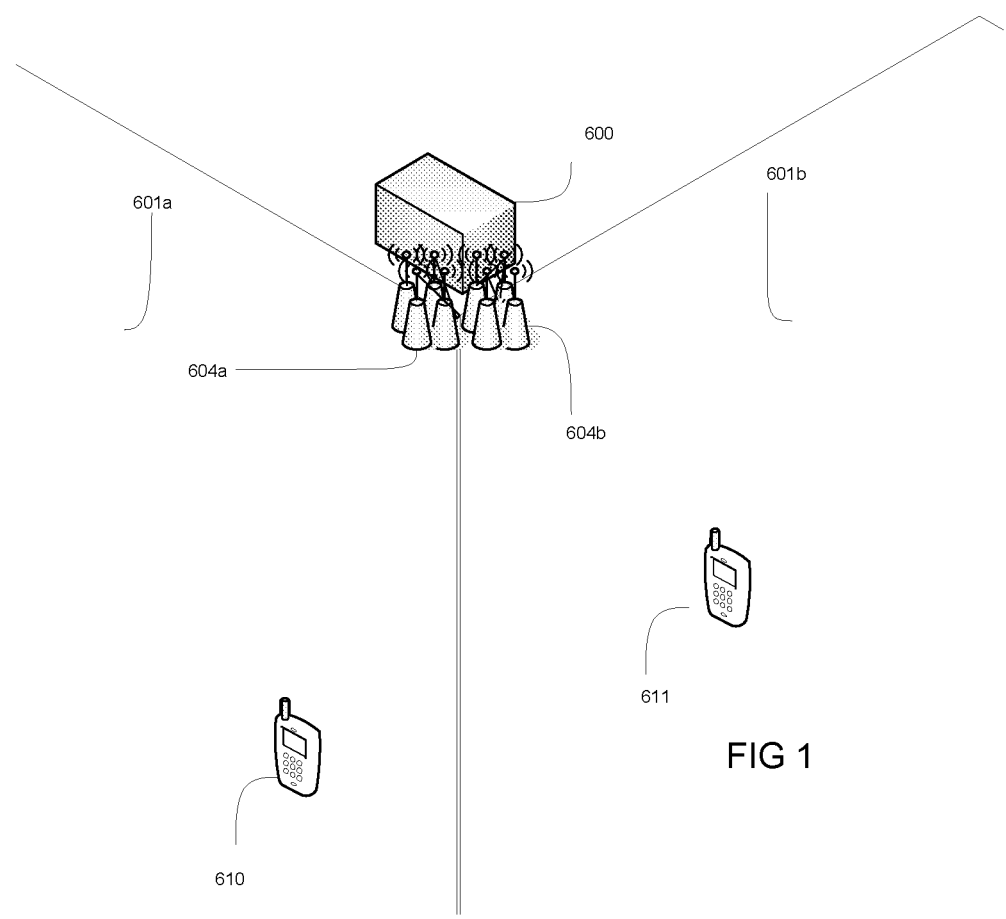
FIG. 1 is a block diagram of a network where the invention is implemented.

In an exemplary embodiment of the invention illustrated on FIG. 1, a secondary station 610 is within a serving cell 601a and communicates with a primary station 600. In this example, the primary station 600 serves cells 601a and 601b. In an example of this embodiment of the invention, such a telecommunication system operates under the UMTS specifications or LTE specifications. Accordingly, the primary station 600 may be an eNodeB and the secondary station 610 is a User Equipment (UE). A second cell 601b neighboring cell 601a is represented on FIG. 1. This cell 601b is controlled by the same primary station 600. A secondary station 611 is in the second cell 601b and communicates with the primary station 600.

For the sake of clarity only one secondary station per cell is represented, however, a plurality of secondary stations may be within a cell.

Primary station 600 comprises an antenna array divided in two subarrays 604a and 604b respectively dedicated to each respective cell, in this example four antennas per cell (but can be more (e.g. 8 or 16 per cell)). In accordance with a cooperative beamforming mode, the secondary station 610 may receive signals from antennas 604a and 604b dedicated to cells 601a and 601b. The consequence of the having a single primary station serving two cells, and as well of having the cooperative beamforming mode active is that the downlink communication channels are time aligned. Even if in other examples the communication channels may not be totally synchronized, the invention reduces the amount of interference experienced on the PDCCH.

Moreover, to reduce the impact of the interference, solutions examined by the inventors comprises TDMA applied to control channel subframes
Scheduler uses different subframes for PDCCH in different cells on the same frequency. However, some subframes would not be accessible for some User Equipments (UEs) in some cells
Could be combined with a frequency reuse factor applied to control channel carriers. However, cross carrier scheduling required to give all UEs access to all subframes
Can be implemented with no specification changes
Inter subframe resource allocation could be added (known from prior art)
TDMA applied to OFDM symbols
Scheduler uses different OFDM symbols in the control region for PDCCH for different cells on the same frequency. This enables to be backwards compatible with Release 8 PDCCH transmissions if a Release 10 PDCCH is modified to use only a subset of the Release 8 REs in a given OFDM symbol.
Can be implemented based on symbol timing offset between carriers (known from prior art)
FDMA and Frequency re-use factor applied to control channel carriers
From a given site not all the carriers carry PDCCH. However, cross-carrier scheduling would be required for unity frequency reuse factor for PDSCH
Compatible with carrier aggregation
Co-ordination required between schedulers for different cells
The co-ordination could be to agree for a cell a preference on the cell (i.e. carrier) that should provide the PDCCH
No specification changes required (except for addition of cross-carrier scheduling in carrier aggregation as already agreed for Release 10).

Thus, it is required to provide orthogonality (or the possibility of orthogonality) between PDCCH transmissions from different cells. This approach should enable successful functioning of the network with synchronized cells with time aligned subframes (e.g. controlled by the same eNB). In addition, it is considered how to make the transmission scheme backwards compatible with earlier release terminals, in the sense that such terminals can operate properly in a network that implements the invention, while orthogonality can be maintained for terminals implementing the invention.

As a consequence, the embodiments of the invention propose new methods for achieving control channel orthogonality in LTE. It is to be noted that for methods based on "puncturing", in this context puncturing means that for a RE (resource element) where a signal would be present without puncturing, nothing is transmitted when the RE is punctured. In fact, the primary station is muted and does not transmit anything on the punctured RE. On the contrary, the unpunctured Resource Elements are REs where the primary station does transmit.

Figure 2:
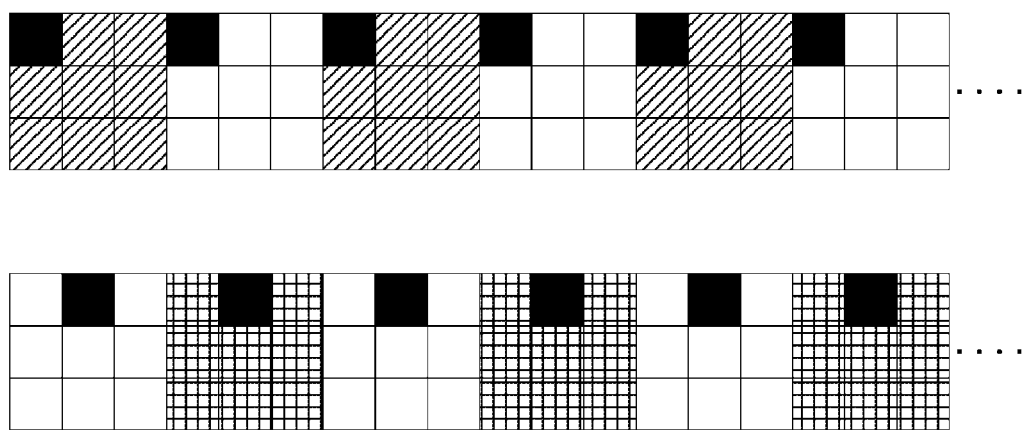
FIG. 2 is a time frequency diagram showing the possible scheduling of PDCCHs in accordance with a first embodiment.

In accordance with a first embodiment of the invention, illustrated on FIG. 2, FDMA and Frequency re-use factor are applied to control channel resource blocks used for PDCCH. FIG. 2 is a time frequency diagram showing the resource blocks (square of nine resource elements, each resource element is represented as a square). On FIG. 2, it is shown that the available resource blocks for PDCCH for the first cell (striped blocks of the top diagram) are not to be used by the second cell for the PDCCH. Similarly, the resource blocks available for PDCCH in the second cell are not interfered by any transmission from the first cell. FIG. 2 shows Resource blocks used for PDCCH in two neighbouring cells, with re-use factor applied to control channel resource blocks.

This embodiment has the advantage to be backwards compatible with Release 8 PDCCH transmissions if a Release 10 PDCCH is modified to use only a subset of the Release 8 resource blocks. For a Rel 10 UE the Rel 8 resources in given RBs are punctured according to the cell ID to provide a new set of orthogonal resources. The number of different sets of orthogonal resources is equal to the re-use factor (e.g. 2 out of 3 RBs are punctured for a re-use factor of 3). To keep the performance similar to Rel 8, the aggregation level should be increased before puncturing (e.g. by a factor of 2 or 4).

Figure 3:
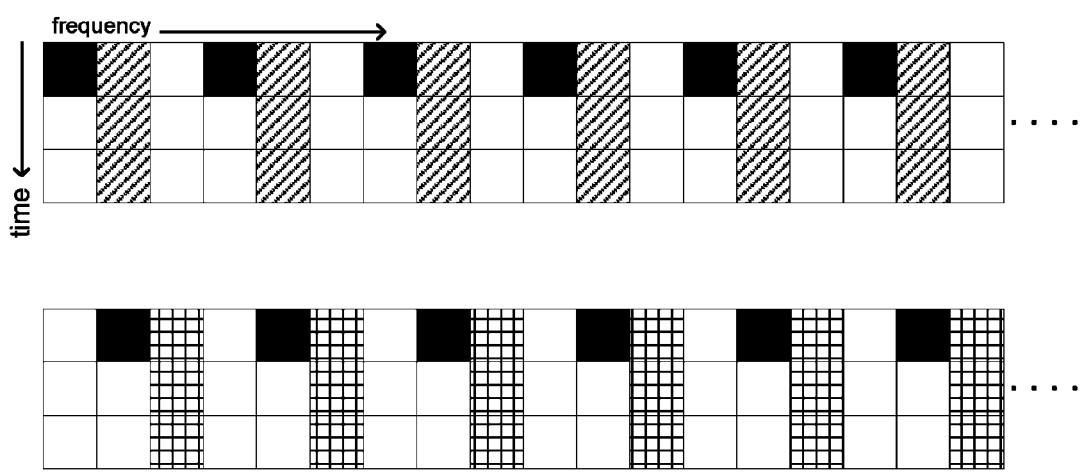
FIG. 3 is a time frequency diagram showing the possible scheduling of PDCCHs in accordance with a second embodiment.

In accordance with a second embodiment of the invention, illustrated on FIG. 3, FDMA and Frequency re-use factor applied to control channel sub-carriers. FIG. 3 shows Resource blocks used for PDCCH in two neighbouring cells, with re-use factor applied to control channel sub-carriers.

This embodiment is also backwards compatible with Release 8 PDCCH transmissions if a Release 10

PDCCH is modified to use only a subset of the Release 8 sub-carriers. For a Rel 10 UE, the Rel 8 sub-carriers are punctured according to the cell ID to provide a new set of orthogonal resources. The number of different sets of orthogonal resources is equal to the re-use factor (e.g. 2 out of 3 RBs are punctured for a re-use factor of 3). To keep the Rel 8 performance, the aggregation level should be increased before puncturing (e.g. by a factor of 2 or 4).

In accordance with this embodiment, co-ordination is required between schedulers for different cells. The co-ordination could be to agree a preference on the subset of control CCEs to be used for each cell (for each DCI aggregation level). This is equivalent to a cell-specific preference for the part of the search space to be used.

This requires good orthogonality between sub-carriers (e.g. close timing synchronization between cells).

In a variant of this embodiment, FDMA and Frequency re-use factor are applied to control channel search space: The primary station chooses orthogonal positions in the search space for different UEs in different cells. This means that the schedulers use different PDCCH sub-carriers in different cells on the same frequency. This can be achieved under the assumption of the same system bandwidth and same number of OFDM symbols reserved for control channel. Co-ordination is required between schedulers for different cells. The co-ordination could be to agree a preference on the subset search space elements be used for each cell (for each DCI aggregation level). This is equivalent to a cell-specific preference for the part of the search space to be used. Again, this may require good orthogonality between sub-carriers (e.g. close timing synchronization between cells). However, this can be implemented with no changes to the standard specification.

Modified search spaces could also be added for Release 10 UEs. With new search space designs (e.g. if reduced/modified search spaces are specified for carrier aggregation), the search space could be a UE specific configuration, or depend on the Cell ID.

If the number of OFDM symbols allocated for control information is different between the cells then two different search space positions are not necessarily fully orthogonal in different cells.

Note: In LTE there is a further complication due to insertion of CRS and PHICH in different positions in different cells. This means that two different search space positions are not necessarily fully orthogonal in different cells (see FIG. 4). In such cases it would be helpful if the number of CRS and the PHICH durations are the same in both cells.

Figure 4:
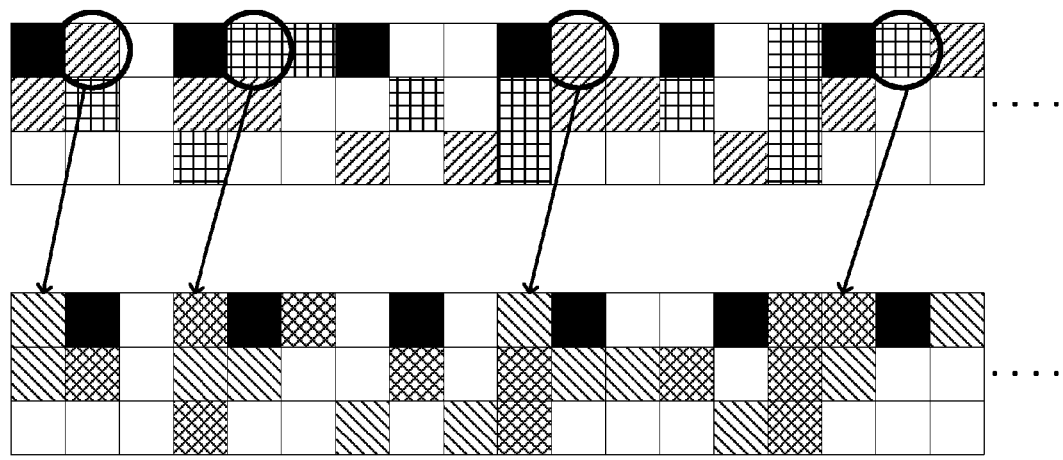
FIG. 4 is a time frequency diagram showing the possible scheduling of PDCCHs in accordance with a third embodiment.

On FIG. 4, two search space positions for the first cell (striped and squared) are orthogonal within Cell A. Some resource elements for the same search space positions are different in Cell B (designated with arrows). The two search space positions for the second cell (striped and squared) are still orthogonal in Cell B. The potentially interfering transmissions from the two cells arising from control channels in positions both striped (for example) are orthogonal between the two cells except for the CRS locations (black)

However, the bigger problem for receiving the "non-orthogonal" resource elements is probably interference from CRS instead of PDCCH.

CDM applied to control channel search

An orthogonal spreading code is applied to the PDCCH transmission. If by a factor of 2, 4 or 8, this would correspond directly to a larger PDCCH format size. Two alternative examples are:

Spreading could be applied at the symbol level

Spreading could be achieved by generating one or more additional copies of the PDCCH message (with the spreading code elements applied per message).

This has the advantage that the at least one copy of the message would be transmitted in a backwards compatible way.

Each copy of the message could be transmitted in a defined part of the search space (e.g. sequentially). In this case, spreading could be applied as part of the rate matching process where multiple copies of the information bits are generated.

If the number of OFDM symbols allocated for control information is different between the cells then two PDCCH transmissions in different cells, with different spreading codes but otherwise identical, would occupy different resource elements and orthogonal spreading codes would not generally result in orthogonal signals.

Note: In LTE there is a further complication due to insertion of CRS and PHICH in different positions in different cells. This means that two PDCCH transmissions in different cells, with different spreading codes but otherwise identical, may occupy different resource elements and therefore may not be fully orthogonal between the different cells. In such cases it would be helpful if the number of CRS and the PHICH durations are the same in both cells. However, the bigger problem for receiving the "non-orthogonal" resource elements is probably interference from CRS instead of PDCCH.

Thus, in accordance with the embodiments of the invention, it is proposed to use one or more of the described method, which reduces the amount of interference for the PDCCH.

One of the preferred solution is the puncturing of frequency domain control channel resources to provide orthogonality between cells. The transmissions according to the new scheme are backwards compatible.

It is also possible to have a spreading code or sequence applied to control channel to provide orthogonality between cells. This can be done in a way whereby at least part of the information transmitted according to the new scheme is in a form which is backwards compatible In accordance with another embodiment, it is proposed to have a selection of a resource set (position in search space) in one cell known to be orthogonal to the resource sets used in a neighbouring cell.

In all of these variants, it may be relevant to provide some signalling between eNBs e.g. to indicate which puncturing/spreading code/resource sets are in use.

In accordance with another embodiment, it is proposed a system like LTE, where the downlink transmissions from adjacent cells are synchronized and time-aligned at the sub-frame level. This can be achieved easily for cells controlled by the same eNodeB. Preferably the cells have the same carrier frequency and system bandwidth. The control channel transmissions (PDCCH) from different cells are preferably orthogonal in the frequency domain. This is achieved by puncturing the PDCCH transmissions from a given cell in a given set of RBs corresponding to the cell ID. In a preferred embodiment every Mth RB is unpunctured. Preferably M=3 for the case of 3 cells supported from the same cell site. Preferably M=2 for the case of non-overlapping femto cells inside the coverage area of a macro cell. The UE is informed by signalling that the puncturing is applied.

In a variation of the preferred embodiment the puncturing is per sub-carrier and every Mth sub-carrier is unpunctured. In this case the unpunctured sub-carriers preferably do not contain CRS.

In a further variation the set of unpunctured RBs (or sub-carriers) further depends on the OFDM symbol considered.

In a variation the set of unpunctured RBs (or sub-carriers) is signalled to the UE or depends on Cell ID mod M.

In a variation the size of the coded PDCCH data block is expanded by a factor of N (N=2, 4 or 8) before puncturing. In LTE this can be achieved by choosing a different PDCCH format with a larger number CCEs.

In further variations:
The puncturing is applied only for some PDCCH messages (e.g. in the UE specific search space).
The puncturing is applied only over part of the search space (e.g. the existing search space is unpunctured to allow communication with UEs not using the invention, but a new search space is added including puncturing)
The search space is modified if puncturing is applied (e.g. increased for large PDCCH format sizes and/or reduced for small PDCCH format sizes)
The puncturing is applied only for some PDCCH formats (e.g. only formats with large sizes)
The puncturing is applied only for some DCI formats (e.g. those indicating transmission modes suitable for communication at the cell border, typically robust modes with low data rates)
The puncturing is applied only on some carriers (e.g. carriers used by femto cells inside macro cell coverage areas)

Another preferred embodiment is the same as the first embodiment (and the above variations), except that puncturing by a factor M is replaced by spreading by a factor M.

At least some aspects of the invention can be applied to other control channels such as PHICH in LTE.

The embodiments of this invention have particular, but not exclusive, application to wireless communication systems such as UMTS, UMTS LTE, and UMTS LTE-Advanced, as well as wireless LANs (IEEE 802.11n) and broadband wireless (IEEE 802.16).

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A network comprising:
a primary station configured to communicate with a secondary station and including a transmitter configured for sending control data in a signal on a subset of a set of resources to the secondary station synchronously with a further primary station further transmitting further control data in a further signal on a further subset of the set of resources to a further secondary station;
the secondary station configured to communicate with the primary station and including a receiver configured to receive the control data in a signal from the primary station synchronously with receiving, via the receiver, the transmission of the further control data from the further primary station;
the further primary station configured to communicate with the further secondary station and including transmitting via a further transmitter configured to send further control data in a further signal on the further subset of the set of resources to the further secondary station synchronously with the transmitting of control data on the subset of the set of resources from the primary station to the secondary station;
the further secondary station configured to communicate with the further primary station and including a further receiver configured to receive the further control data synchronously with receiving via the further receiver, the transmission of control data from the transmitter of the primary station; and
the primary station transmitter configured to arrange the transmission of control data to be orthogonal to the transmission of further control data from the further transmitter of the further primary station.

2. A primary station comprising:
a transmitter configured to transmit control data in a signal on a subset of a set of resources to a secondary station synchronously with a further transmission of further control data on a further subset of the set of resources from a further primary station to a further secondary station; and
the transmitter configured to arrange the control data transmission to be orthogonal to a transmission of further control data from the further primary station to the further secondary station.

3. A secondary station comprising:
a receiver configured to receive control data from a primary station according to at least one of the group of: a subset of a set of resources, a search space, and a spreading code or any combination thereof,
wherein the control data received at the secondary station from the primary station is orthogonal to the reception of further control data from a further primary station to a further secondary station.

4. A secondary station comprising:
a receiver configured to receive control data in a signal on a subset of a set of resources from a primary station synchronously with a transmission of further control data in a further signal on a further subset of the set of resources from a further primary station to a further secondary station; and
the receiver configured to receive the control data signal that is orthogonal to the further signal of further control data.

5. A primary station comprising:
a transmitter configured to transmit control data in a signal to a secondary station according to at least one of: a subset of a set of resources, a search space, and a spreading code or any combination thereof,
the transmitter configured to transmit the control data to the secondary station orthogonal to the reception of further control data transmitted from a further primary station to a further secondary station.

6. A non-transitory computer-readable storage-medium having stored thereon instructions that when executed cause processing circuitry of a primary station to
transmit control data in a signal on a subset of a set of resources to a secondary station synchronously with a transmission of further control data on a further subset of the set of resources from a further primary station to a further secondary station; and arrange the transmission of the control data to be orthogonal to a transmission of further control data from the further primary station to the further secondary station.

7. A non-transitory computer-readable storage-medium having stored thereon instructions that when executed cause processing circuitry of a secondary station to receive control data in a signal on a subset of a set of resources from a primary station synchronously with a further signal of further control data transmitted from a further primary station to a further secondary station on a further subset of the set of resources; and receive control data in the signal that is orthogonal to the further signal of further control data.

8. A primary station comprising:

a transmitter configured to transmit control data in a signal on a subset of a set of resources to a secondary station synchronously with a further transmission of further control data in a further signal on a further subset of the set of resources from a further primary station to a further secondary station;

the transmitter is configured to arrange the control data signal to be orthogonal to the further signal of further control data transmitted from the further primary station to the further secondary station; and wherein:

the primary station and the further primary station are included in a same single base station;

the set of resources comprising a plurality of one of the group of: subcarriers; and Resource Blocks; and the transmitter is configured to prevent transmission of control data in the signal from the primary station to the secondary station on the subset of the set of resources during the transmission synchronous with and orthogonal to the further transmission, for enabling the further transmitter of the further primary station to further transmit further control data in the further signal on the subset of the set of resources during the transmission synchronous with and orthogonal to the further transmission.

9. A secondary station comprising:

a receiver configured to receive control data in a signal on a subset of a set of resources from a primary station synchronously with a transmission of further control data in a further signal on a further subset of the set of resources from a further primary station to a further secondary station; and the receiver configured to receive control data in the signal that is orthogonal to the further signal of the further control data; and wherein:

the primary station and the further primary station are included in a same single base station;

the set of resources comprising a plurality of one of: subcarriers, and Resource Blocks or any combination thereof; and when the further transmitter of the further primary station prevents the further transmission of further control data in the further signal from the further primary station to the further secondary station on the further subset of the set of resources during the transmission synchronous with and orthogonal to the further transmission, and wherein the receiver is configured to receive control data in the signal from the primary station on a further subset of the set of resources during the transmission synchronous with and orthogonal to the further transmission.

10. A method for operating a primary station, the method comprising: in the primary station transmitting by a transmitter control data on a subset of a set of resources to a secondary station synchronously with a further transmission of further control data on a further subset of the set of resources from a further primary station to a further secondary station; and arranging by the transmitter, control data transmission to be orthogonal to the further transmission of the further control data from the further primary station.

11. A method for operating a secondary station in a network the method comprising: in the secondary station:

receiving by a receiver, control data in a signal on a subset of a set of resources from a primary station synchronously with a further transmission of further control data in a further signal on a further subset of the set of resources from a further primary station to a further secondary station; and wherein the signal of control data is orthogonal to the further signal of further control data.

12. The primary station of claim 2, wherein the primary station is located at the further primary station and the cells are adjacent cells.

13. The primary station of claim 2, wherein the secondary station and the further secondary station are the same secondary station.

14. The primary station of claim 2, wherein the orthogonal transmission of control data to the secondary station is orthogonal in the frequency domain, to the transmission of further control data to the further secondary station.

15. The primary station of claim 14, wherein:

the orthogonal transmission comprises: the primary station transmitting control data on the subset of the set of resources, and the further primary station transmitting further control data on the further subset of the set of resources; and the subset and the further subset are different subsets of the set of resources.

16. The primary station of claim 2, wherein:

the subset of the set of resources comprises a subset of a plurality of Resource Blocks, and wherein the orthogonal transmission comprises: the primary station transmitting control data on a subset of the Resource Blocks, and the further primary station transmitting further control data on a further subset of the Resource Blocks; and the subset and further subset are different subsets of the plurality of Resource Blocks.

17. The primary station of claim 2, wherein:

the subset of the set of resources comprises a subset of a plurality of Resource Blocks; and the subset of the plurality of Resource Blocks comprises one Resource block every M Resource Blocks of the plurality of Resource Blocks, where M is an integer.

18. The primary station of claim 2, wherein:

the subset of the set of resources comprises a subset of a plurality of Resource Blocks; and the subset of the plurality of Resource Blocks comprises one resource block every M Resource Blocks of the plurality of Resource Blocks, where M equals 3 or 6.

19. The primary station of claim 2, wherein:

the subset and further subset of the set of resources comprises respective subsets of a plurality of subcarriers, and wherein the orthogonal transmission comprises: the primary station transmitting control data on the subset of the plurality of subcarriers, and the further primary station transmitting further control data on the further subset of the plurality of carriers; and the subset and the further subset are different subsets of the plurality of subcarriers, such that, the primary station transmits control data on the subset of the set of subcarriers synchronously with the further primary station transmitting the further control data on the further subset of the set of subcarriers.

20. The primary station of claim 2, wherein:
the subset and further subset of the set of resources comprises respective subsets of a plurality of subcarriers, and
the orthogonal transmission comprises the primary station transmitting control data on the subset of the plurality of subcarriers, and the further primary station transmitting further control data on a further subset of the plurality of subcarriers; and
the subset and further subset are different subsets of the plurality of subcarriers, such that, the further primary station uses the further subset of subcarriers for transmitting further control data; and
the respective subsets of the plurality of subcarriers comprise one subcarrier every M subcarriers of the plurality of subcarriers, where M is an integer.

21. The primary station of claim 2, wherein the subset of the set of resources is determined by an indication of an identity of the cell of the primary station.

22. The primary station of claim 2, wherein an indication of the subset of the set of resources is signaled by the primary station to the further primary station.

23. The primary station of claim 2, wherein an indication of the subset of the set of resources is signaled by the primary station to the secondary station.

24. The primary station of claim 2, wherein:
the secondary station searches for control data in messages that it receives from the primary station by decoding messages potentially included in a search space; and
the further secondary station searches for the further control data in further messages that it receives, by decoding all the further messages potentially included in a further search space, and
the orthogonal transmission comprises the primary station configuring the search space of the secondary station, such that, at least one piece of resource of the search space of the secondary station is not included in the further search space of the further secondary station.

25. The primary station of claim 2, wherein:
the secondary station searches in messages that it receives for control data by decoding messages potentially included in a search space of the secondary station; and
the search space is determined from an indication of an identifier of the cell of the primary station.

26. The primary station of claim 2, wherein:
the secondary station searches in messages that it receives from the primary station for control data by decoding messages potentially included in a search space of the secondary station; and
an indication of the search space is signaled by the primary station to the further primary station.

27. The primary station of claim 2, wherein:
the secondary station searches in messages that it receives from the primary station for control data by decoding messages potentially included in a search space of the secondary station; and
an indication of the search space is signaled by the primary station to the secondary station.

28. The primary station of claim 2, wherein the orthogonal transmission comprises:
the primary station applying a spreading code to the transmission of control data from the primary station; and the spreading code being orthogonal to a further spreading code applied to the further transmission of further control data from the further primary station.

29. The primary station of claim 2, wherein:
the orthogonal transmission comprises the primary station applying a spreading code to the transmission of control data in a signal from the primary station to the secondary station; and
the spreading code is determined from an indication of an identity of the cell of the secondary station.

30. The primary station of claim 2, wherein:
the orthogonal transmission comprises the primary station applying a spreading code to the transmission of control data from the primary station to the secondary station; and
an indication of the spreading code is signaled by the primary station to the further primary station.

31. The primary station of claim 2, wherein:
the orthogonal transmission comprises the primary station applying a spreading code to the transmission of control data from the primary station to the secondary station; and
an indication of the spreading code is signaled by the primary station to the secondary station.

32. The primary station of claim 2, wherein:
both control data and further control data are transmitted in respective signals to both the secondary station and the further secondary station; and
the secondary station discards the further control data and the further secondary station discards the control data.

33. The primary station of claim 2, wherein the transmitter of the primary station is configured to prevent transmission of control data in a signal from the primary station to the secondary station on the subset of the set of resources during the transmission synchronous with and orthogonal to the further transmission, for enabling the further transmitter of the further primary station to further transmit further control data in the further signal on the subset of the set of resources during the transmission synchronous with and orthogonal to the further transmission.

34. The primary station of claim 2, wherein:
the primary station and the further primary station are included in a same single base station;
the set of resources comprising a plurality of one of: subcarriers, and Resource Blocks or any combination thereof; and
the transmitter is configured for preventing to prevent transmission of control data in the signal from the primary station to the secondary station on the subset of the set of resources during the transmission synchronous with and orthogonal to the further transmission, for enabling the further transmitter of the further primary station to further transmit further control data in the further signal on the subset of the set of resources during the transmission synchronous with and orthogonal to the further transmission.

35. The secondary station of claim 4, wherein:
the primary station is located at the further primary station; and
the cell and further cell are adjacent cells.

36. The secondary station of claim 4, wherein the secondary station and the further secondary station are the same secondary station.

37. The secondary station of claim 4, wherein the orthogonal transmission of control data to the secondary station is orthogonal in the frequency domain to the transmission of further control data to the further secondary station.

38. The secondary station of claim 4, wherein:
the orthogonal transmission comprises: the primary station transmitting control data on a subset of the set of resources, and the further primary station transmitting further control data on a further subset of the set of resources; and
the subset and further subset are different subsets of the set of resources.

39. The secondary station of claim 4, wherein:
the subset of the set of resources comprises a subset of a plurality of Resource Blocks; and
the orthogonal transmission comprises: the primary station transmitting control data on a subset of the plurality of Resource Blocks, and the further primary station transmitting further control data on a further subset of the plurality of Resource Blocks; and
the subset and further subset are different subsets of the plurality of Resource Blocks.

40. The secondary station of claim 4, wherein:
the subset of the set of resources comprises a subset of a plurality of Resource Blocks; and
the subset of the set of Resource Blocks comprises one Resource block every M Resource Blocks of the plurality of Resource Blocks, where M is an integer.

41. The secondary station of claim 4, wherein:
the subset of the set of resources comprises a subset of a plurality of Resource Blocks; and
the subset of the plurality of Resource Blocks comprises one Resource block every M Resource Blocks of the plurality of Resource Blocks, where M equals 3 or 6.

42. The secondary station of claim 4, wherein:
the subset and the further subset of the set of resources comprises respective subsets of a plurality of subcarriers, and
the orthogonal transmission comprises: the primary station transmitting control data in a signal on the subset of the plurality of subcarriers, and the further primary station transmitting further control data in a further signal on a further subset of the plurality of subcarriers; and
the subset and further subset are different subsets of the plurality of subcarriers, such that, the primary station transmits the data signal in the signal on the subset of carriers synchronously with the further primary station transmitting the further control data in a further signal on the further subset of subcarriers.

43. The secondary station of claim 4, wherein:
the subset and further subset of the set of resources comprises respective subsets of a plurality of subcarriers; and
wherein the orthogonal transmission comprises: the primary station transmitting control data in a signal on a subset of the plurality of subcarriers; and the further primary station transmitting the further control data in a signal on a further subset of the plurality of subcarriers; and
the subset and further subset are different subsets of the plurality of subcarriers, such that, the further primary station uses the subset of the plurality of subcarriers for transmitting control data, and the respective subsets of the plurality of subcarriers comprise one subcarrier every M subcarriers of the plurality of subcarriers, where M is an integer.

44. The secondary station of claim 4, wherein the subset of resources is determined by an indication of the identity of the cell of the secondary station.

45. The secondary station of claim 4, wherein an indication of the subset of the set of resources is signaled by the primary station to the further primary station.

46. The secondary station of claim 4, wherein an indication of the subset of the set of resources is signaled by the primary station to the secondary station.

47. The secondary station of claim 4, wherein:
the secondary station searches for control data in messages that it receives from the primary station, by decoding the messages potentially included in a search space; and
the further secondary station searches for the further control data in further messages that it receives, by decoding all the further messages potentially included in a further search space; and
the orthogonal transmission comprises the primary station configuring the search space of the secondary station, such that, at least one piece of resource of the search space of the secondary station is not included in the further search space of the further secondary station.

48. The secondary station of claim 4, wherein:
the secondary station searches in messages that it receives for control data by decoding messages potentially included in a search space of the secondary station; and
the search space is determined from an indication of an identifier of the cell of the secondary station.

49. The secondary station of claim 4, wherein:
the secondary station searches in messages that it receives from the primary station for control data by decoding messages potentially included in a search space of the secondary station; and
an indication of the search space is signaled by the primary station to the further primary station.

50. The secondary station of claim 4, wherein:
the secondary station searches in messages that it receives from the primary station for control data by decoding the messages potentially included in a search space of the secondary station; and
an indication of the search space is signaled by the primary station to the secondary station.

51. The secondary station of claim 4, wherein the orthogonal transmission comprises:
the primary station applying a spreading code to the transmission of control data in a signal from the primary station to the secondary station; and
the spreading code being orthogonal to a further spreading code applied to the further transmission of further control data in a further signal from the further primary station to the further secondary station.

52. The secondary station of claim 4, wherein:
the orthogonal transmission comprises the primary station applying a spreading code to the transmission of the control data in a signal from the primary station to the secondary station; and
the spreading code is determined from an indication of an identity of the cell of the secondary station.

53. The secondary station of claim 4, wherein:
the orthogonal transmission comprises the primary station applying a spreading code to the transmission of control data from the primary station to the secondary station; and
an indication of the spreading code is signaled by the primary station to the further primary station.

54. The secondary station of claim 4, wherein:
the orthogonal transmission comprises the primary station applying a spreading code to the transmission of control data from the primary station to the secondary station; and an indication of the spreading code is signaled by the primary station to the secondary station.

55. The secondary station of claim 2, wherein:
both the secondary station and the further secondary station receive both the control data signal and the further control data signal; and
the secondary station discards the further control data and the further secondary station discards the control data.

56. The secondary station of claim 2, wherein when the further transmitter of the further primary station prevents the further transmission of further control data in the further signal from the further primary station to the further secondary station on the further subset of the set of resources during the transmission synchronous with the further transmission of the respective signal orthogonal to the further signal, the receiver of the secondary station is configured to receive control data in the signal from the primary station on the further subset of the set of resources during the transmission synchronous with the further transmission of the respective signal orthogonal to the further signal.

57. The secondary station of claim 2, wherein:
the primary station and the further primary station are included in a same single base station;
the set of resources comprising a plurality of one of: subcarriers, and Resource Blocks or any combination thereof; and
when the further transmitter of the further primary station prevents the further transmission of further control data in the further signal from the further primary station to the further secondary station on the further subset of the set of resources during the transmission synchronous with the further transmission of the respective signal orthogonal to the further signal, and wherein the receiver of the secondary station is configured to receive control data in the signal from the primary station on the further subset of the set of resources during the transmission synchronous with the further transmission of the respective signal orthogonal to the further signal.

* * * * *